Aug. 23, 1932. C. R. WAGNER 1,873,728
METHOD OF TREATING HYDROCARBON OILS
Filed Dec. 17, 1928
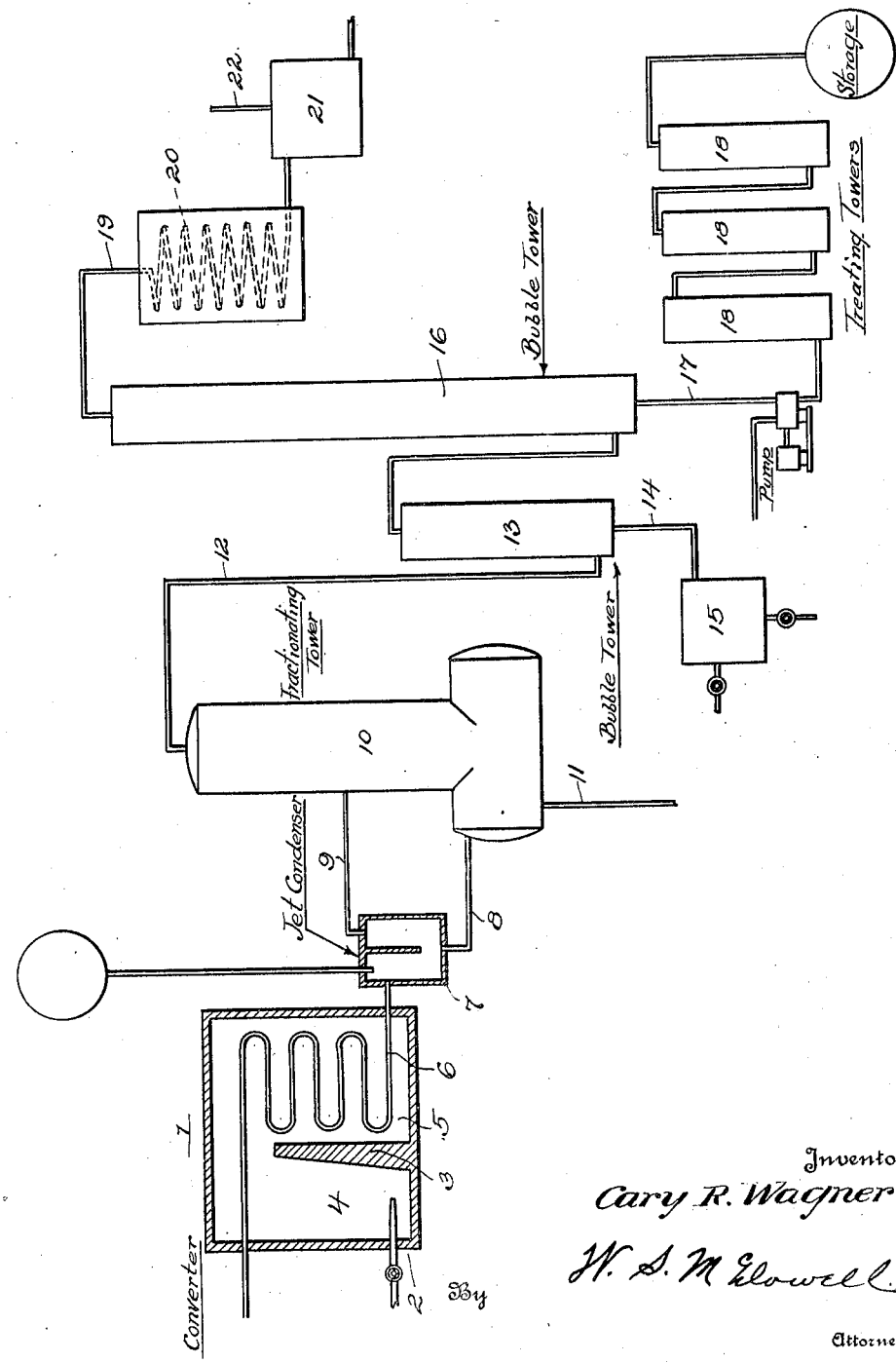

Patented Aug. 23, 1932

1,873,728

UNITED STATES PATENT OFFICE

CARY R. WAGNER, OF CHICAGO, ILLINOIS, ASSIGNOR TO THE PURE OIL COMPANY, OF CHICAGO, ILLINOIS, A CORPORATION OF OHIO

METHOD OF TREATING HYDROCARBON OILS

Application filed December 17, 1928. Serial No. 326,625.

This invention relates to an improved method of treating hydrocarbon oils, and has particular reference to the treatment of distillates obtained from high temperature or vapor phase cracking processes, especially motor fuel distillates. The primary object of the invention resides in treating a motor fuel distillate which contains a large per cent of unsaturates in such manner as to remove undesirable compounds therefrom, especially those compounds which discolor the oil and produce gum deposits therein, and to effect this result in such manner that while the oil under treatment is completely purified or treated so far as practical requirements are concerned, yet the treatment will be sufficiently mild to avoid removing from the oil compounds which are in fact desirable and should be permitted to remain in the oil. The process thus provides for the treatment of oils containing unsaturated compounds to effectively remove undesirable constitutents but to carry out the process so as to avoid removing from the oil any of the more desirable fractions or constituents.

My invention may be carried out in connection with the apparatus illustrated in the accompanying drawing, wherein the figure is a diagrammatic view of apparatus units which may be utilized in attaining the ends of the invention.

In the accompanying drawing the numeral 1 designates a converter. This converter may be of any suitable type but for convenience in illustration it has been shown as consisting of a setting 2, divided internally by a bridge wall 3 to produce combustion and tube chambers 4 and 5 respectively. Within the chamber 5 there is arranged a bank of tubes 6 through which the oil under treatment is passed. Adequate temperatures are maintained within the chambers 4 and 5 to heat the oil under treatment, which may be a gas oil fraction, to a vaporizing and converting temperature in excess of 1000° F., the vapors being maintained within the tubes for a sufficient period of time, usually not in excess of 10 seconds, to secure the desired degree of conversion or molecular decomposition. The converted vapors leaving the tube 6 pass through the jet condenser 7 in which raw oil is introduced by way of the line 8, leading from a suitable source of oil supply. Within the condenser 7 the raw oil comes into direct contact with the converted vapors so that the temperature of such vapors is lowered to a non-conversion temperature not in excess of approximately 600° F.

From the condenser 7 the oils which remain in vapor form after being cooled to such last named temperature are passed by way of a pipe line 9 to a fractionating tower 10, and the liquid condensate which accumulates in the bottom of the condenser 7 is transferred by way of a line 11 to the bottom of the tower 10. The liquid condensate which accumulates in the bottom of the tower 10 may be suitably removed therefrom and re-circulated, if desired, through the converter 1 for additional heat treatment or may be otherwise disposed of.

The low boiling point vapors leave the top of the tower 10 and pass by way of a pipe line 12 to the bottom of a primary bubble tower 13. Within the bottom of this tower there accumulates a liquid condensate suitable for use as a motor fuel. This latter condensate, however, has a rather high initial boiling point and contains undesirable compounds which are rather difficult to remove. I accomplish this, however, by passing said condensate from the bottom of the bubble tower through a pipe line 14 to a treating tank 15, wherein the distillate is intermingled preferably with 66° sulphuric acid, which attacks the undesirable compounds. The treated oil may then be transferred to a still and distilled with or without the presence of steam. The clear motor fuel passes over and is condensed in the usual manner, while the undesirable compounds attacked by the sulphuric acid remain behind in the still. They may be disposed of as fuel oil or otherwise.

The temperature prevailing in the bubble tower 13 is sufficiently high to permit a large proportion of the oil under treatment to remain in the vapor phase. These vapors are passed from the top of the first bubble tower 13 into the bottom of an elongated second bubble tower 16, in which there takes place a certain amount of condensation. This condensate collects or accumulates in the bottom of the tower 16 and is removable therefrom by means of a pipe line 17. This distillate is considerably lower in boiling point, however, than the distillate removed from the bottom of the primary tower 13 but may possess an initial boiling point as high as 175° to 200° F.

It has been found that to treat this distillate with the strong sulphuric acid used in treating the distillate obtained from the tower 13 a detrimental effect is produced thereon, since the acid serves not only to attack the undesirable fractions but in addition attacks a very considerable proportion of the desirable unsaturates, with the result that there is an unnecessary loss or diminution in the quality of the distillate recovered as motor fuel.

I therefore use a lighter though effective method of treating the distillate obtained from the bottom of the tower 16. This method consists preferably in passing said second tower distillate through the line 17 through a plurality of continuous treater tanks 18 through which the oil flows serially. These tanks contain a treating material consisting primarily of ferric sulphate and improved results are obtained by mechanically agitating the oil and the treating compound during the passage of the former through the tanks 18. This method of treatment serves to polymerize the undesirable unsaturated compounds so that the latter may be withdrawn separately from the system as regards the desired or purified fractions. These latter fractions may be transported to a storage tank for subsequent use. In lieu of employing ferric sulphate, I may utilize fuller's earth, or fuller's earth in combination with a certain proportion of ferric sulphate. Again, instead of using ferric sulphate and fuller's earth I may treat the distillate obtained from the bottom of the second tower 16 with a 70 per cent aqueous solution of sulphuric acid. The latter, however, because of its decreased strength does not burn or detrimentally affect the desirable portions or compounds of the distillate as would occur if ordinary 66° sulphuric acid were employed. The treated oil is then re-distilled in the same manner as the distillate from the bottom of 13, the finished product being a clear motor fuel of stable properties.

The second tower 16 is of considerable length in order that the hydrocarbon vapors passing therethrough may be subjected for a period of time to temperatures sufficiently high to polymerize, without the aid of a catalyst, the undesirable unsaturated hydrocarbons, and in this connection a temperature of approximately 200° to 250° F. is maintained in the second tower 16. The oils which pass in vapor form through the tower 16 contain to some extent that class of hydrocarbons known as fulvenes, one type of diolefins, of such a structure that they polymerize rapidly under heat but these polymers seem to decompose when subjected to slight additional temperatures to form the original compounds again. The vapors during their travel through the second bubble tower are not additionally heated but are maintained at a temperature of roughly 200° to 250° F. for a sufficient period of time to permit the undesirable compounds to polymerize and to drop to the bottom of the tower 16 for removal and proper subsequent treatment. The time required to accomplish this treatment will vary, according to the type of charging stock and depending upon the temperatures and pressures employed, from about 30 seconds to five minutes, or if extremely high pressures are employed an even greater period of time may be required.

The oils which remain in the vapor phase pass from the tower 16 by way of a pipe line 19 to a condenser 20, of any suitable type, wherein the vapors are reduced to liquid form and pass to a collecting tank 21. The permanent gases may be removed from this tank by a line 22 and suitably processed or utilized. The liquid distillate which accumulates in the tank 21 has been found to possess a water-white color, is 80 to 85% unsaturated and has an end point of from 200 to 250° F. This distillate possesses high antiknock value when used as a motor fuel and is admirably suited as a blending stock for motor fuels produced by other processes which yield products relatively low in antiknock value.

In view of the foregoing it will be seen that an outstanding feature of the present invention resides in fractionating a body of oil vapor which is relatively high in unsaturated constituents and then taking the several cuts produced by fractionation and treating them to the best advantage in the matter of removing undesirable constituents but not affecting the desirable constituents. In many systems it is customary to treat the entire body of oil vapor in the same manner, that is, by one method of treatment such, for example, as by passing the entire body of oil under process of purification through fuller's earth, either while the oil is in the liquid or in the vapor phase, or again, it is customary to use sulphuric acid of different concentrations. In the present invention, however, cognizance is taken of the fact that by fractionating the oil under process of purification many of the disadvantages inherent in ordinary practice are overcome. For this reason I interpose the bubble towers 13 and 16 in the vapor line to obtain distillates of different boiling points. The distillate of high boiling point containing compounds which are difficult to separate are treated with the 66° sulphuric acid, the next distillate of somewhat lower boiling point obtained from the bottom of the second bubble tower is treated with an agent which exercises a somewhat less harsh or energetic effect on the oil than does the 66° acid. Experience has demonstrated that if the 66° acid were used on the distillate secured from the second bubble tower the reaction would be so strong that a very appreciable proportion of the valuable constituents would be removed from the system with the undesirable constitutents. Conversely, if the milder treating agents were used on the distillate obtained from the bubble tower 13, such an agent would not possess the requisite strength to remove completely from said distillate the undersirable compounds, leaving in the latter quantities of gum and color producing compounds to such an extent as to render the distillate unsuitable for motor fuel purposes. Then again, a very large per cent of the oil under treatment does not need to be reacted upon by a treating agent, since it has been found that by merely subjecting these very light fractions to heat, with or without the aid of a contact or catalytic material, suitable polymerization can be secured to effect the rejection of the undesirable unsaturated hydrocarbons. These co-operative steps carried in sequence provide for the very effective treatment of hydrocarbon vapors obtained from high temperature cracking systems and produce purified oils suitable for motor fuel purposes, enabling the largest per cent of such oils to be obtained from the total oil under treatment and with minimum losses due to the successive steps of treatment in removing the undesirable compounds. It is the undesirable compounds only which are removed from the oil. The distillates secured by the present method of purification while containing large proportions of unsaturated hydrocarbons are of water-white color and practically free from compounds which tend to produce gum deposits in the oil or to discolor the same. Not only is this true in reference to said distillates at the time they are produced but also after such distillates have been stored for customary periods of time and transported for commercial use.

What is claimed is:

1. In a process for removing color-imparting and gum-forming bodies from cracked oils obtained from vapor phase systems of conversion, the steps which comprise passing oil vapors obtained from a vapor phase conversion system through a fractionating zone, fractionally condensing the vapors passing through said zone to produce a plurality of condensates of varying boiling range, subjecting the condensates of higher boiling range to the action of concentrated sulphuric acid to polymerize the undesirable color-imparting and gum-forming compounds present therein, separately removing from said fractionating zone a second condensate of lower boiling range than said first named condensate and treating said second named condensate with sulphuric acid of lower concentration than the concentration of said first named sulphuric acid to polymerize the undesirable compounds therein contained, separately withdrawing at a third point from said fractionating zone vapors of oils of lower boiling range than said first and second named condensates, and maintaining the vapors of said low boiling oils in said fractionating zone for a sufficient period of time to effect the polymerization and separation of the undesired compounds from said vaporized oils without contacting the vapors with sulphuric acid.

2. A process for removing color-imparting and gum-forming compounds from cracked petroleum oils having the boiling range of ordinary gasoline and containing a high percentage of unsaturated compounds, which comprises: passing a stream of such oils in a vaporized state through a fractionating zone, controlling the temperature and rate of flow of said vapors through said zone to successively produce therein a condensate of high boiling range and a second condensate of a relatively low boiling range, separately removing the condensate of high boiling range from the fractionating zone and mixing therewith concentrated sulphuric acid in sufficient quantities to effect the formation of removable polymerization products containing said undesirable compounds, separately removing from said fractionating zone the second condensate of lower boiling range and mixing therewith dilute sulphuric acid in quantities sufficient to effect the formation of removable polymerization products containing compounds of the aforesaid undesirable character, maintaining uncondensed oil vapors of low boiling range in said fractionating zone for a sufficient period of time to polymerize undesirable constituents therein present, and separately removing at a third point from said fractionating zone the uncondensed oils and condensing and collecting the same.

In testimony whereof I affix my signature.

CARY R. WAGNER.